United States Patent
Yocono, Sr. et al.

[11] Patent Number: 5,172,483
[45] Date of Patent: Dec. 22, 1992

[54] OUTLET BOX LOCATOR

[76] Inventors: Thomas F. Yocono, Sr., P.O. Box 84; Thomas F. Yocono, Jr., P.O. Box 65, both of Munsonville, N.H. 03457

[21] Appl. No.: 824,079
[22] Filed: Jan. 23, 1992
[51] Int. Cl.⁵ ............................... G01B 5/14
[52] U.S. Cl. ........................ 33/528; 33/DIG. 10
[58] Field of Search .................... 33/528, DIG. 10

[56] References Cited

U.S. PATENT DOCUMENTS

| | | | |
|---|---|---|---|
| 2,646,626 | 7/1953 | Palin | 33/DIG. 9 X |
| 3,924,331 | 12/1975 | Goosen | 33/DIG. 10 X |
| 3,950,857 | 4/1976 | Zanaich | 33/DIG. 10 X |
| 3,991,474 | 11/1976 | Rath | 33/462 |
| 4,202,388 | 5/1980 | Wieting | 33/DIG. 10 X |
| 5,040,304 | 8/1991 | Jackson | 33/DIG. 10 X |

*Primary Examiner*—Harry N. Haroian
*Attorney, Agent, or Firm*—Hayes, Soloway, Hennessey & Hage

[57] ABSTRACT

An outlet location device for marking the location of an outlet box or the like sealed behind a panel comprises a first plate and second plate slidably mounted to one another. Each plate carries a locator pin extending normally from one side of the plate, and a marking pin extending normally from the other side of the plate and opposite the locator pin. The first and second plates are slidably affixed to one another so that the distance between the first and second locator pins may be adjusted to fit into the cover plate mounting holes of an installed outlet box.

6 Claims, 3 Drawing Sheets

OUTLET BOX LOCATOR

BACKGROUND OF THE INVENTION

The present invention relates to building construction and more particularly is directed to a device for facilitating cutting of access openings for electrical outlet and switch boxes and the like in wall and ceiling covering panels such as sheets of wallboard or so-called drywall, wood paneling and the like. The invention will be described in connection with the construction of homes, although it will be understood that the invention also may be advantageously used in connection with the construction of commercial buildings such as stores and offices in which electrical wiring is run behind finished walls.

In the construction of homes, after framing, the electricians secure to the upright studs the electrical outlet and switch boxes. The wiring is then run, and the interior wall panels are affixed to the upright studs after first providing cutouts in the wall panels for the outlet and switch boxes. Accurately locating the cutouts is time consuming, and errors in locating cutout holes may result in substantial additional finishing costs and/or scraping of panels.

Several devices have been proposed in the art for assisting in locating cutout holes and are exemplified, for example, by U.S. Pat. Nos. 1,612,455, 3,950,857, 4,059,905, 4,126,941, 4,202,388, 4,259,785, 4,285,135 and 4,802,284. However, the various prior art devices are somewhat cumbersome to use, and/or are single use devices requiring the carpenter to carry a set of devices for single and multiple outlets, high hats, etc. Also, due to variations in mounting hole spacings amongst outlet boxes, etc., from different manufacturers, single use devices have proved to be less than satisfactory. And prior art adjustable devices are relatively complicated in construction and accordingly relatively expensive.

OBJECTS OF THE INVENTION

It is thus a primary object of the present invention to provide a new and improved panel marking tool which overcomes the aforesaid and other disadvantages of the prior art outlet location devices.

Another object of the present invention is to provide a low cost outlet location device that is simple and easy to use.

Yet another object of the present invention is to provide an outlet location device which is adjustable to fit a variety of size and shape boxes or the like.

SUMMARY OF THE INVENTION

The present invention provides an outlet location device for marking the location of an outlet box or the like which overcomes the various disadvantages of the prior art. More particularly, the marking device provided by the present invention comprises, in combination, a two piece adjustable bracket comprising a first plate and a second plate mounted to one another. Each plate carries a locator pin extending normally from one side of the plate, and a marking pin extending normally from the other side of the plate and opposite the locator pin. The first and second plates are slidably affixed to one another so that the distance between the first and second locator pins may be adjusted to fit into the cover plate mounting holes of an installed outlet box.

Other features and advantages of the present invention will become apparent from the following detailed description taken in conjunction with accompanying drawings in which like numerals depict like parts, and wherein:

BRIEF DESCRIPTION OF THE DRAWINGS

Referring to FIGS. 1-3, an outlet locating device in accordance with the present invention comprises a bracket 1 of generally rectangular plan. Bracket 1 comprises a two piece assembly consisting of a first plate 2 and a second plate 3, which plates are slidably mounted to one another as will be described in detail hereinafter, so that the length of bracket 1 may be changed, for example, to adopt to different size outlet boxes. Referring in particular to FIG. 2, the locating device in accordance with the present invention has two combination locator/marking pins 5/6 mounted adjacent the distal ends of plates 2 and 3, respectively, and extending perpendicularly from both sides of the plates. Preferably pins 5 and 6 are circular in cross-section and may be drawn to a point, i.e. as shown in FIG. 2. Alternatively, as shown in FIG. 4, locator pins 5a and 6a may be blunted, e.g. for safety purposes. Pins 5 and 6 may be fixed to plates 2 and 3, respectively, by welding or by any other convenient manner, for example, threading into an internally threaded hole provided in the plates, or by threading onto nuts 4 and 7, respectively, which nuts also act as spacers.

Figure 1:
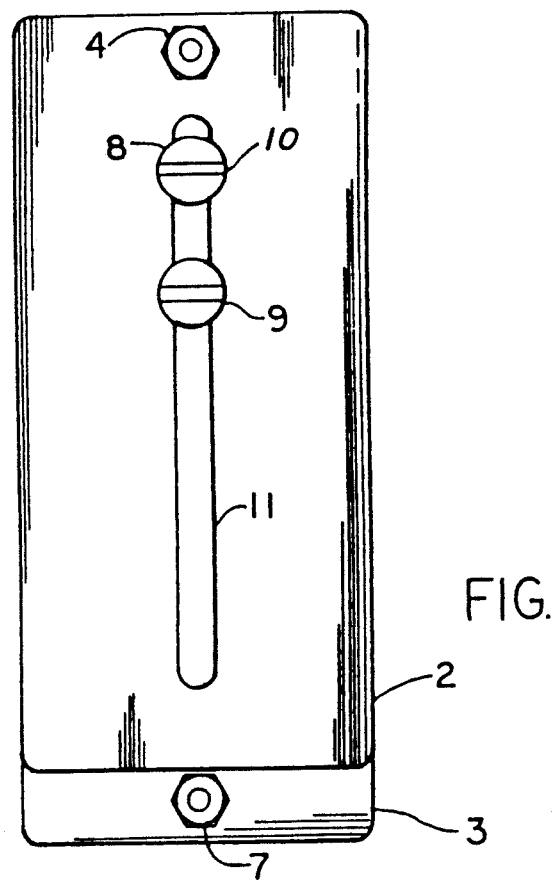
FIG. 1 is a top plan view of one embodiment of an outlet locating device made in accordance with the present invention.
Figure 2:
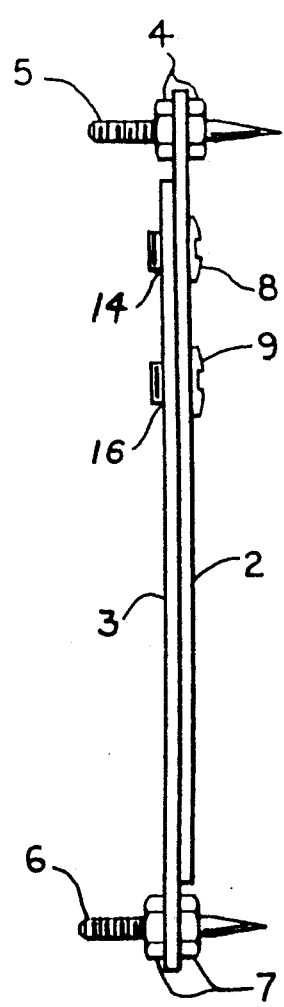
FIG. 2 is a side view of the outlet locating device shown in FIG. 1.
Figure 3:
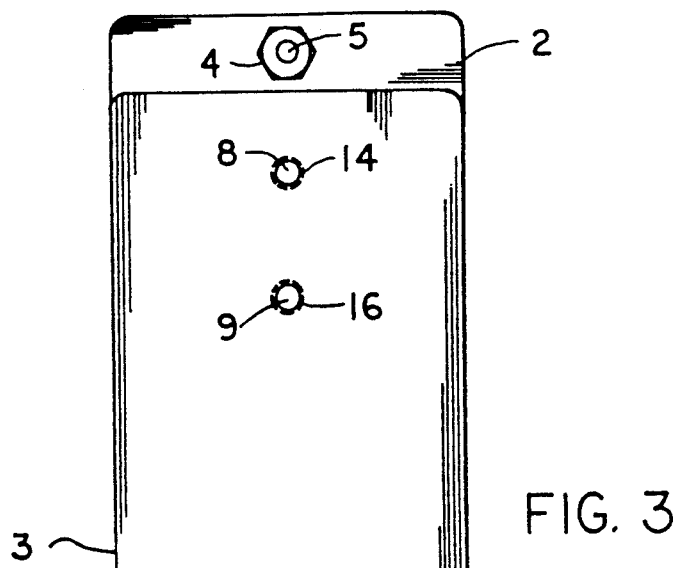
FIG. 3 is a bottom plan view of the outlet locating device shown in FIG. 1.

Elongated slot 11 provided in plate 2 provides in cooperation with adjusting screws 8 and 9 which are threaded into spaced, internally threaded holes 14 and 16, respectively, provided in plate 3, means for adjusting the length of bracket 1 and thus the spacing between pins 5 and 6, respectively, for different mounting hole spacings. The screw and nut fasteners may take other forms. For example, screws 8 and 9 may comprise thumbscrews.

Figure 5:
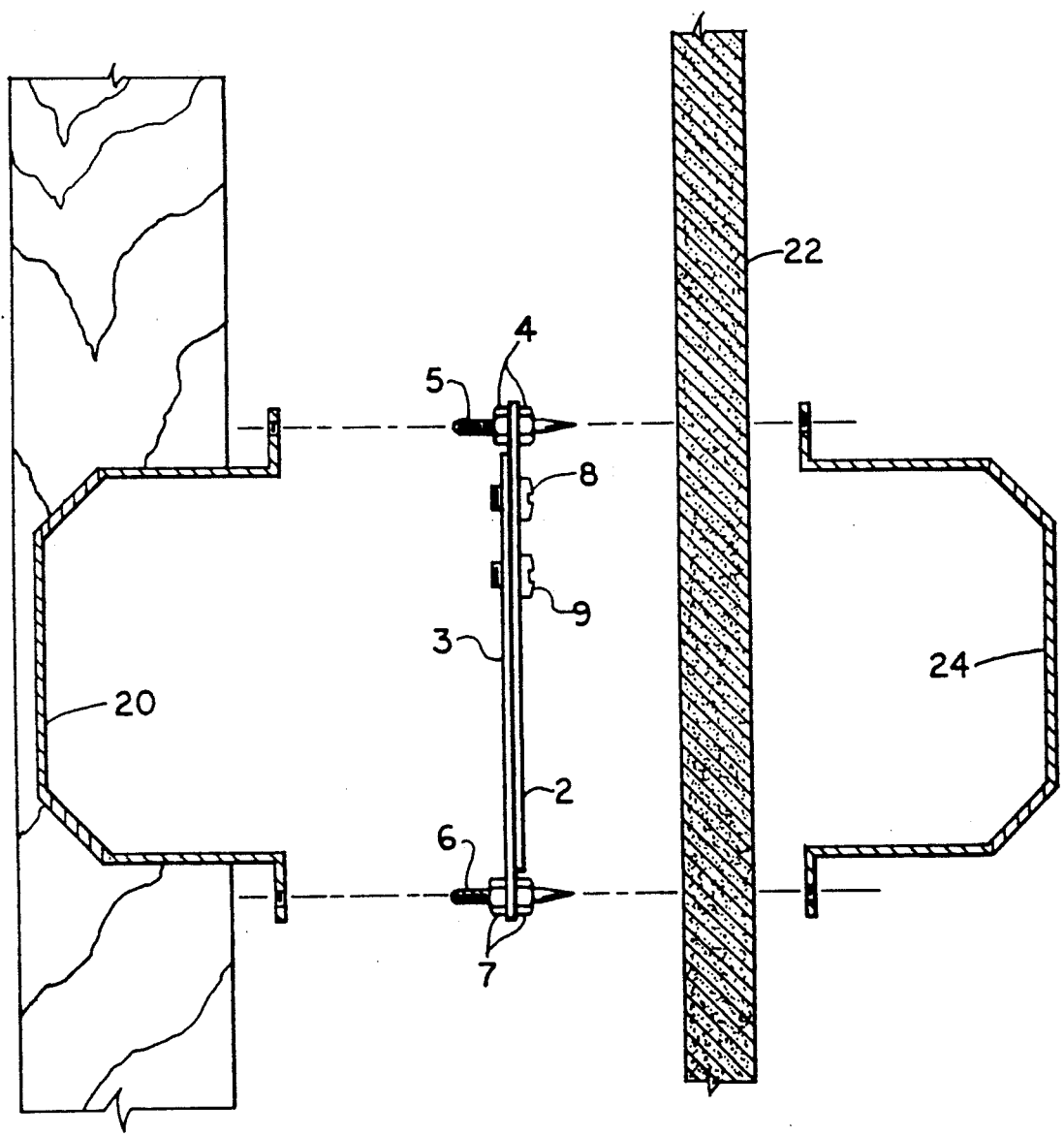
FIG. 5 is an exploded isometric view of the outlet locating device of the present invention, showing the sequence of use.

Referring to FIG. 5, in use, the locating device in accordance with the present invention is adjusted so that pins 5 and 6 fit the mounting hole spacings of the outlet boxes used in the construction. Generally, boxes from a single manufacturer may be used throughout a construction project so it is typically necessary to adjust the locating device only once. However, adjustments readily may be made in the field. The locating device is then positioned with one end of pins 5 and 6 extending through the mounting holes of an installed outlet box 20 and the wallboard 22 moved into position and gently tapped so that the other end of pins 5 and 6 penetrate the board. The worker may then locate an identical sized box 24 on the protruding pins, and using the box as a template draw and/or directly cut an outline of the box. In the case of a ganged outlet, multiple locating devices made in accordance with the present invention may be employed, if desired. However, it is generally sufficient to mark only a single box, and the marking from that one box may then be used to mark the opening for the multiple ganged outlets.

Figure 4:
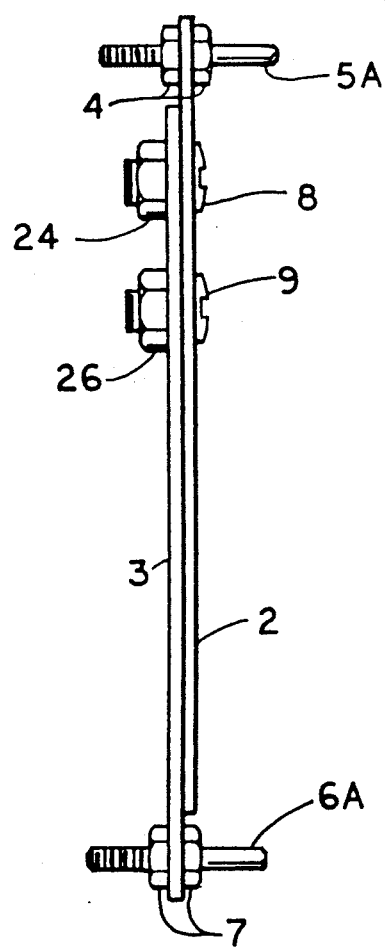
FIG. 4 is a side view of an alternative embodiment of outlet locating device made in accordance with the present invention.

Alternatively, in using a locating device as shown in FIG. 4, the pins will not penetrate the board, but merely leave indentations. The wallboard is then taken down, and the markings used to locate a loose box. The box outline is then drawn as before, and cutout holes may then be made in normal manner.

As will be seen from the foregoing, the outlet locating device made in accordance with the present invention facilitates construction. Moreover, the device is simple to use, and may be employed advantageously with a variety of electrical outlet boxes of various source and size.

Various modifications may be made to the above-described invention without departing from the spirit or scope of the invention. For example, screw 8 may be replaced by a pin which is affixed to plate 3 to maintain alignment of the plates, in cooperation with screw 9. Also, nuts 24, 26 (FIG. 4) may be provided for cooperation with screws 8 and 9, and, if desired, both plates 2 and 3 may be slotted. Still other modifications will be apparent.

We claim:

1. A device for locating an access hole to an electrical outlet box sealed behind a covering panel, and comprising in combination a two piece adjustable bracket comprising a first plate and a second plate, slidably mounted to one another, and locator and marking pins carried on each plate, and extending normally therefrom from both sides of said plate, whereby to permit adjustment of spacing of both the locator and marking pins.

2. A device according to claim 1, and including means for locking said plates in fixed position relative to one another.

3. A device according to claim 1, wherein said first plate has an elongate slot formed therein and said second plate has a pair of spaced, internally threaded holes, and said means for locking comprises a pair of screws, extending through said slot in said first plate, and threaded into said pair of internally threaded holes in said second plate.

4. A device according to claim 5, wherein said marking pins are tapered to a point.

5. A device for locating an access hole to an electrical outlet box sealed behind a covering panel, and comprising in combination a two piece adjustable bracket comprising a first plate and a second plate, slidably mounted to one another, said first plate having an elongate slot formed therein and said second plate having a pair of spaced, internally threaded holes, a pair of screws, extending through said slot in said first plate, and threaded into said pair of internally threaded holes in said second plate for locking said plate in fixed position relative to one another, and locator and marking pins carried on each plate, and extending normally therefrom from both sides of said plate.

6. A device according to claim 5, wherein said marking pins are tapered to a point.

* * * * *